United States Patent [19]

Kobayashi

[11] Patent Number: 5,060,209
[45] Date of Patent: Oct. 22, 1991

[54] OPTICAL INFORMATION RECORDING AND REPRODUCING APPARATUS WITH VIBRATION ATTENUATING MECHANISM

[75] Inventor: Kazutoshi Kobayashi, Tokorozawa, Japan

[73] Assignee: Olympus Optical Co., Ltd., Tokyo, Japan

[21] Appl. No.: 293,771

[22] Filed: Jan. 5, 1989

[30] Foreign Application Priority Data

Jan. 12, 1988 [JP] Japan ................... 63-004453

[51] Int. Cl.$^5$ .................... G11B 7/00; G11B 25/00
[52] U.S. Cl. ...................... 369/32; 369/263; 360/98.08; 360/99.05; 360/107
[58] Field of Search ............ 360/99.11, 99.12, 99.09, 360/99.08, 99.07, 99.06, 99.01-99.05, 107; 369/263, 33, 44.14, 44.17, 44.18, 44.16, 32, 264, 269, 247, 248

[56] References Cited

U.S. PATENT DOCUMENTS 4,099,210  7/1978  Dolby ..................... 360/130.32
4,745,588  5/1988  Yoshikawa et al. ............ 369/32
4,841,517  6/1989  Kurihara et al. ............ 360/99.12
4,890,177  12/1989  Katoh et al. ................ 360/107

FOREIGN PATENT DOCUMENTS

60-136042  7/1985  Japan .

Primary Examiner—Roy N. Envall, Jr.
Assistant Examiner—Thang V. Tran
Attorney, Agent, or Firm—Armstrong, Nikaido, Marmelstein, Kubovcik & Murray

[57] ABSTRACT

An optical information recording and reproducing apparatus comprising a disc motor rotating a photodisc, a light pickup radiating a light beam to this photodisc and at least recording, reproducing or erasing information, a linear motor moving this light pickup means in the direction crossing the recording and reproducing region of the above mentioned photodisc and a linear servo circuit generating a signal driving the linear motor from the light returning from the photodisc. The linear motor driving controlling system is stabilized by providing within this disc motor a damper member attenuating the vibration of the rotary shaft of the disc motor.

11 Claims, 7 Drawing Sheets

OPTICAL INFORMATION RECORDING AND REPRODUCING APPARATUS WITH VIBRATION ATTENUATING MECHANISM

FIELD OF THE INVENTION

This invention relates to an optical information recording and reproducing apparatus wherein a driving controlling system of a light pickup moving means can be stabilized.

Recently, there is noted an optical information recording and reproducing apparatus wherein information can be recorded at a high density in a recording medium (photodisc) and the information recorded at a high density in this photodisc can be reproduced at a high speed.

This optical information recording and reproducing apparatus is provided with a pickup opposed to the above mentioned photodisc so that a light emitted from a semiconductor laser may be condensed by an objective lens provided in the above mentioned pickup and may be condensed and radiated on the above mentioned photodisc. Now, the information track of the above mentioned photodisc has some eccentric amount and there may be used a so-called two-step servo system whereby the objective lens is driven by an acutuator to increase the stability of the objective lens following the track and the optical system (for example, the above mentioned pickup) including the above mentioned objective lens is driven by a linear motor or the like to cancel the eccentricity of the disc. In this two-step servo system, the servo is applied to the above mentioned linear motor so that the amplitude of the objective lens following the eccentric information track may be within a predetermined amplitude. That is to say, the servo amount varies with the mechanical displacement of the disc.

Now, the above mentioned photodisc is rotated by a spindle motor. When a turntable (disc receptacle) is fitted to the motor shaft of this motor, a photodisc is set on this turntable and the above mentioned linear motor is driven, a vibration will be generated by the reaction of this linear motor. This vibration is transmitted to the above mentioned spindle motor arranged on the same chassis as of the above mentioned linear motor, swings the motor shaft of this motor and vibrates the disc fitted to its tip. This vibration is sensed by the above mentioned pickup and is fed back to the above mentioned linear motor. In case the Q of the transmitting element is high, a resonant point will be produced in the linear motor controlling system, the phase margin and gain margin of the linear motor servo system will reduce and the stability of the servo will be ill influenced.

In case not only the above mentioned two-step servo system but also at least the linear motor relates to the tracking servo, the track will be likely to be deviated by the vibration by the reaction of the above mentioned linear motor.

In order to prevent it, it is considered to provide the linear motor with a damper so that the vibration of the linear motor may not be transmitted to the spindle motor. However, as the above mentioned linear motor is relatively heavier than other mechanical elements, the vibrating force of this linear motor is so large that it is difficult to well attenuate the vibration by this vibrating force so as not to be transmitted to the chassis. Also, the above mentioned linear motor drives the pickup, is therefore required to be accurately positioned and the movable range except the position determined by the rail or the like is small. Therefore, if such means as an elastic body is provided to attenuate the vibration at the linear motor, the part fitted with the elastic body will be displaced, the respective component members will contact with each other or the gap of the magnetic circuit will fluctuate and no smooth operation will be made.

An object of the present invention is to provide an optical information recording and reproducing apparatus wherein a driving controlling system of a light pickup moving means can be stabilized.

Another object of the present invention is to provide an optical information recording and reproducing apparatus wherein a light pickup moving means can operate smoothly.

Further another object of the present invention is to provide an optical information recording and reproducing apparatus wherein, without producing a shaft swing in a rotary shaft of a rotating driving means, the vibration of this, rotary shaft can be controlled.

SUMMARY OF THE INVENTION

In the present invention, in an optical information recording and reproducing apparatus comprising a rotation driving means having a rotary shaft rotating an optical recording medium, a light pickup means radiating a light beam to the above mentioned optical recording medium and at least recording, reproducing or erasing information, a light pickup moving means moving the above mentioned light pickup means in the direction crossing the recording and reproducing region of the above mentioned optical recording medium and a driving signal generating means generating a signal driving the above mentioned light pickup moving means from the light returning from the above mentioned optical recording medium, a vibration attenuating means attenuating the vibraton of the above mentioned rotary shaft is provided within the above mentioned rotation driving means to stabilize the control system of the above mentioned light pickup moving means.

The other features and advantages of the present invention will become apparent enough with the following explanation.

BRIEF DESCRIPTION OF THE DRAWINGS

FIGS. 1 to 11 relate to the first embodiment of the present invention.

DETAILED DESCRIPTION OF THE PREFERRED EMBODIMENTS

The first embodiment of the present invention is shown in FIGS. 1 to 11.

This embodiment shows an example of a photomagnetic disc apparatus recording information by inverting the magnetizing direction among so-called photodisc apparatus.

Figure 2:
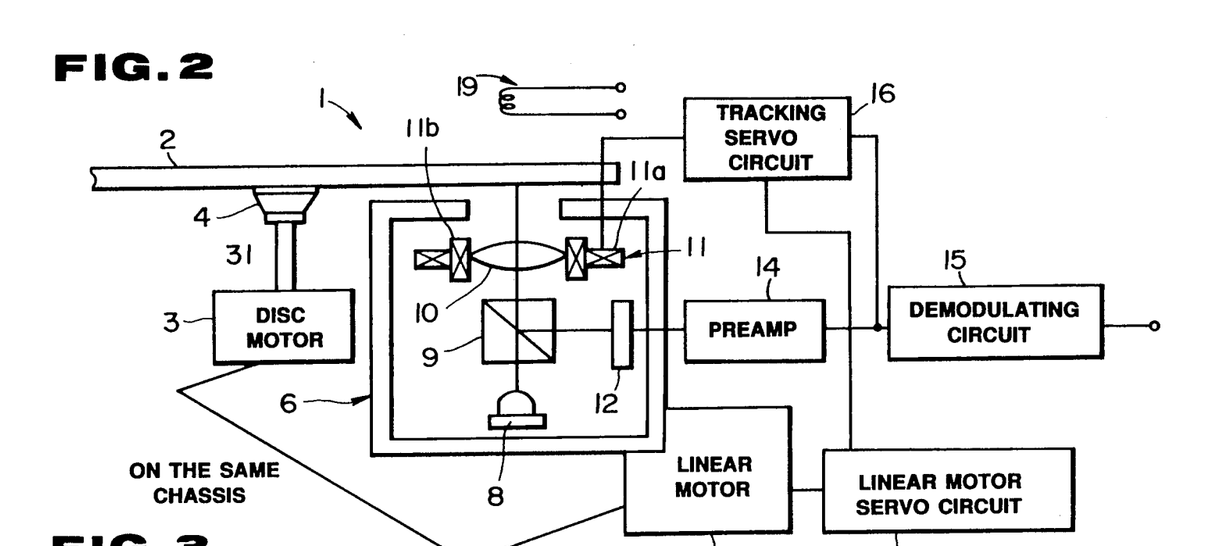
FIG. 2 is an explanatory view showing the formation of a light disc apparatus.

As shown in FIG. 2, a photomagnetic disc apparatus 1 of this embodiment is provided with a disc motor (spindle motor) rotating and driving a photomagnetic disc 2 as a recording medium. The above mentioned photomagnetic disc 2 is fitted to a turntable 4 fitted to the upper end of a motor shaft 31 of this disc motor 3. A light pickup 6 is so arranged as to be opposed to the above mentioned photomagnetic disc 2 and can be moved by a linear motor 7 in the direction crossing the track of the above mentioned photomagnetic disc 2, that is, in the radial direction.

A semiconductor laser 8 is contained within the above mentioned light pickup 6. A light beam emitted from this semiconductor laser 8 passes through a beam splitter 9, is condensed by an objective lens 10 and is radiated like a spot on the above mentioned photomagnetic disc 2. The above mentioned objective lens 10 is held movably by an actuator 11 in the radial direction of the photomagnetic disc 2 and in the optical axial direction of the objective lens 10.

The light radiated on the above mentioned photomagnetic disc 2 and reflected from this photomagnetic disc 2 is condensed by the above mentioned objective lens 10, is refleclted by the above mentioned beam splitter 9 and is received by a light detector 12. The output signal of this light detector 12 is amplified by a preamplifier 14 and is then input into a demodulating circuit 15, tracking servo circuit 16 and focus servo circuit not illustrated. By the above mentioned demodulating circuit 15, a reproduced signal reproducing the information recorded in the photomagnetic disc 2 is obtained from the output signal of the above mentioned light detector 12. Also, by the above mentioned tracking servo circuit 16, a tracking error signal is prodiuced from the output signal of the above mentioned light detector 12. This tracking error signal is applied to a tracking coil 11a of the above mentioned actuator 11 and is input into a linear motor servo circuit 17. The objective lens 10 is moved in the radial direction of the photodisc 2 by the above mentioned tracking coil 11a on the basis of the above mentioned tracking error signal so that the light spot may follow a predetermined track. By the way, though not illustrated, a focus error signal is produced by a focus servo circuit and is applied to a focus coil 11b of the actuator 11. The objective lens 10 is moved in the optical axial direction by the above mentioned focus coil 11b so that the light spot may be focused on the photomagnetic disc 2.

The above mentioned linear motor servo circuit 17 generates a driving signal driving the above mentioned linear motor 7 so that the light spot may follow a predetermined track on the basis of the above mentioned tracking error signal (particularly a low frequency component of it). Thus, in this embodiment, there is made a so-called two-step servo control feeding back the tracking error to the actuator 11 moving the objective lens 10 and the linear motor 7 moving the light pickup 6.

By the way, the above mentioned disc motor 3 and linear motor 7 are provided on the same chassis.

A magnetic field applying apparatus 19 applying a bias magnetic field to the photomagnetic disc 2 at the time of recording or erasing information is provided in the position opposed to the above mentioned light pickup 6 with the above mentioned photodisc 2 between.

Figure 3:
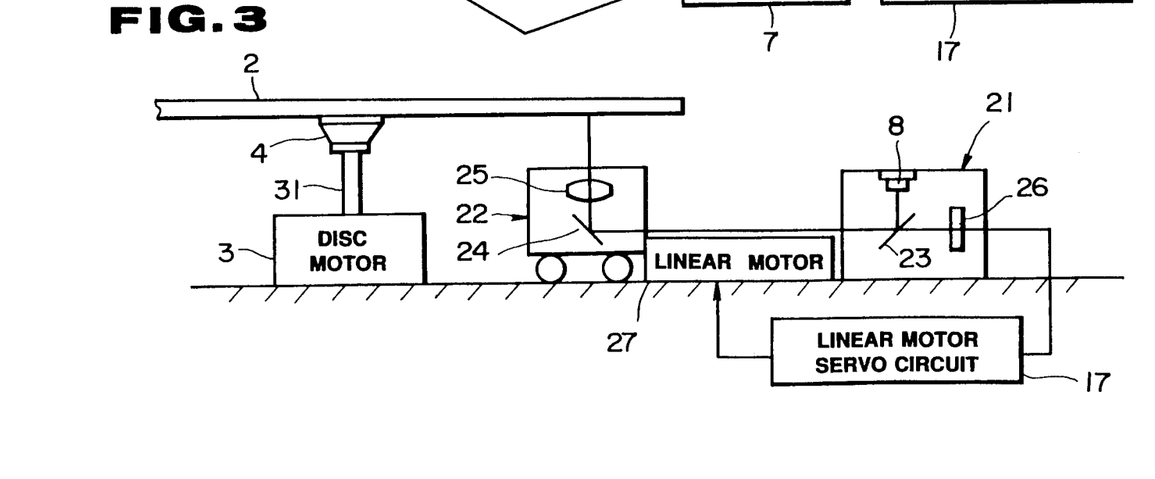
FIG. 3 is an explanatory view showing a modification of a light disc apparatus.

FIG. 3 shows another example of a photodisc apparatus in which a light pickup is separated into a fixed part 21 and movable part 22.

A semiconductor laser 8 is contained within the above mentioned fixed part 21. The light beam emitted from this semiconductor laser 8 is reflected by a beam splitter 23 and is emitted to the above mentioned movable part 22 side. The above mentioned movable part 22 is arranged to be opposed to a photodisc 2 and is provided with a mirror 24 reflecting the light beam from the above mentioned fixed part 21 to the photodisc 2 side and an objective lens 25 condensing the light beam reflected by this mirror 24 and radiating it to the above mentioned photodisc 2. The light radiated to the above mentioned photodisc 2 and reflected by this photodisc 2 is condensed by the above mentioned objective lens 25, is reflected by the above mentioned mirror 24, is emitted to the above mentioned fixed part 21 side, passes through the above mentioned beam splitter 23 within this fixed part 21 and is received by a light detector 26.

The above mentioned movable part 22 can be moved in the radial direction of the above mentioned photodisc 2 by a linear motor 27. This linear motor 27 is driven by a control signal produced by a linear servo circuit 17 on the basis of the output signal of the above mentioned light detector 26 and moves the above mentioned movable part 22 in the radial direction of the photodisc 2 so that the light spot may follow a predetermined track.

By the way, in the photodisc apparatus shown in FIG. 3, the tracking servo may be made by only the movement of the above mentioned movable part 22 or by a two-step servo system moving also the objective lens 25 by an actuator.

The other formations are the same as in the photodisc apparatus shown in FIG. 2.

Figure 1:
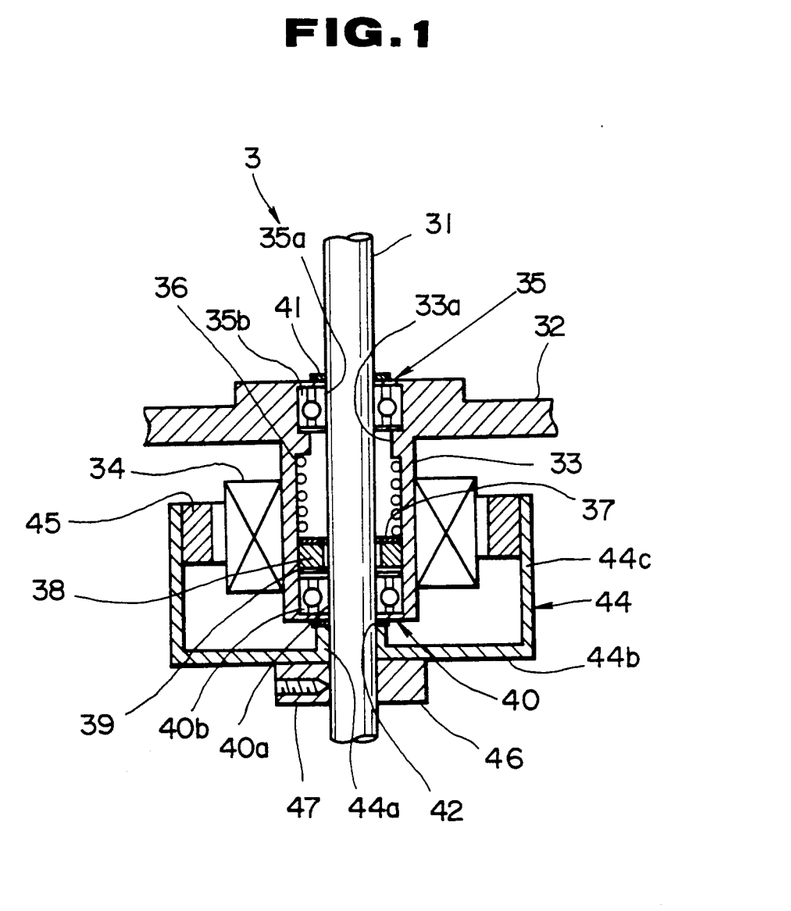
FIG. 1 is a sectioned view of a disc motor.

A disc motor 3 in this embodiment is formed as shown in FIG. 1.

That is to say, a circular hole is formed in a holder 32 and a cylindrical motor stator part 33 is erected below coaxially with this circular hole. A coil 34 is fitted to this motor stator part 33 on the outer periphery. Alternatively, though not illustrated, a stator yoke may be fitted in addition to the coil 34. A small diameter part 33a is formed on the upper side of the inner periphery of the above mentioned motor stator part 33. A first bearing 35 is contained above the above mentioned small diameter part 33a within the above mentioned motor stator part 33. On the other hand, a spring 36, washer 37, damper member 38 such as of rubber, washer 39 and second bearing 40 are contained in the order from above below the above mentioned small diameter part 33a. A motor shaft 31 is inserted through the above mentioned motor stator part 31 which is rotatably supported in the above mentioned holder 32 by the above mentioned bearings 35 and 40.

Both of the above mentioned bearings 35 and 40 are, for example, ball bearings. The inner race 35a of the first bearing 35 is pressed and fixed to an E- ring 41 fixed to the above mentioned motor shaft 31 on the upper side of this bearing 35. The inner race 40a of the second bearing 40 is pressed and fixed to a rotor 44 through a washer 42. The outer races 35b and 40b of both bearings 35 and 40 are pressed and fixed to the inner peripheral part of the motor stator part 33.

By the way, the above mentioned spring 36, washer 37 and damper 38 have inner holes of a size not contacting the above mentioned motor shaft 31 and the washer 39 has an inner hole larger than of the inner race 40a so as to be pressed by only the outer race 40b of the second bearing 40.

The above mentioned E-ring 41 is formed to be of a size pressed by only the inner race 35a of the first bearing 35. On the other hand, the above mentioned washer 42 is formed to be of a size pressed by only the inner race 40a of the above mentioned second bearing 40.

The above mentioned rotor 44 has a small diameter part 44a externally fitted to the above mentioned motor shaft 31, a disk part 44b connected to this small diameter part 44a at the lower end and a cylindrical part 44c extended to the upper side from the outer peripheral part of this disk part 44b. A magnet 45 opposed to the above mentioned coil 34 at a predetermined distance, is fitted to the inner peripheral part of the above mentioned cylindrical part 44c. A thick cylindrical fixing part 46 externally fitted to the above mentioned motor shaft 31 is provided below the above mentioned small diameter part 44a and disk part 44b. A fixing screw 47 is screwed in through this fixing part 46 from the outer peripheral side to the inner peripheral side. The above mentioned rotor 44 is fixed to the above mentioned motor shaft 31 by this fixing screw 47.

In the disk motor 3 of such formation, the rotating position of the magnet is detected by a magnet position detecting device (for example, a hall device) not illustrated fitted to the stator side. When an electric current is fed to the coil 34 fitted to the motor stator part in response to its output, the above mentioned rotor 44 and motor shaft 31 will be rotated by a torque produced by the current of this coil 34 and the magnetic field of the magnet 45 fitted to the rotor 44.

By the way, this disk motor 3 is assembled as follows:

First, the first bearing 35 is fitted to the motor stator part 33 of the holder 32. Then, the motor shaft 31 fitted with the E-ring 41 is inserted through the above mentioned motor stator Part 33. The spring 36, washer 37, damper 38, washer 39, second bearing 40, washer 42 and rotor 44 are externally fitted to the above mentioned motor shaft 31. The inner race 40a of the above mentioned second bearing 40, washer 42 and small diameter part 44a of the rotor 44 are closely fitted to the motor shaft. The rotor 44 is fixed to the motor shaft 31 with the fixing screw 4 under a properly applied pre-pressure.

In such disk motor 3, the bearing pre-pressure is applied to the outer race 40b of the second bearing 40 through the washer 37, damper 38 and washer 39 by the spring 36. The inner race 40a of the a mentioned bearing 40 is pressed and fitted to the 44. These rotor 44 and motor shaft 31 are fixed by fixing screw 47. Further, the inner race 35a of the first bearing 35 is pressed and fitted to the E-ring 41 to this motor shaft 31. Therefore, both bearings 35 and 40 are subjected to the pre-pressure by the spring and damper 38.

By such pre-pressure formation, the bearing part of the motor shaft 31 becomes a system in which the viscosity resistance of the damper member is added to the spring constant of the spring 36 control the vibration of the motor shaft 31. As a the peak of the resonant point of the linear motor system is remarkably reduced.

Now, the operation and effects of such embodiment shall be explained in detail a with the case of using a conventional spindle as a disk motor.

Figure 4:
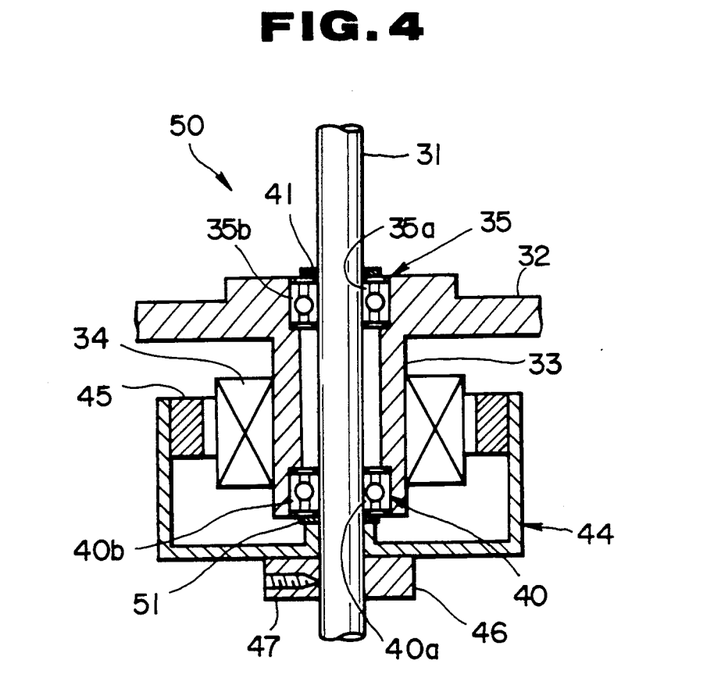
FIGS. 4 and 5 are sectioned views showing conventional spindle motors.
Figure 5:
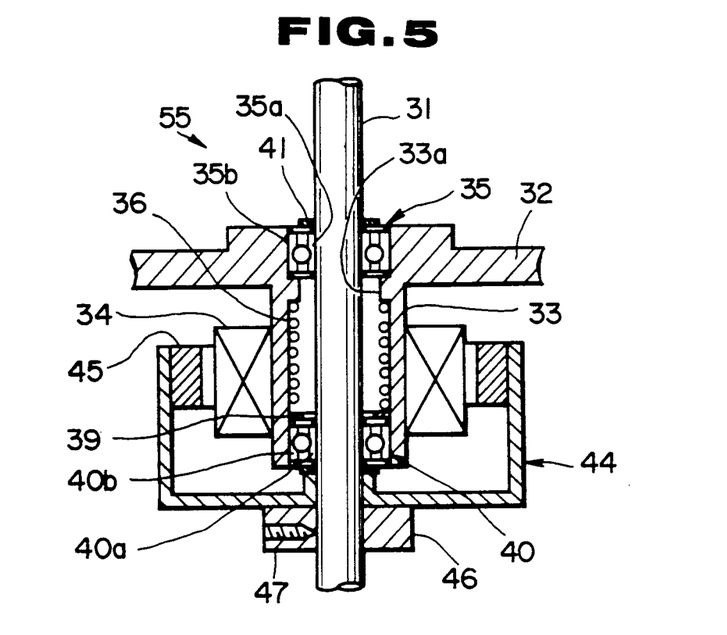

FIGS. 4 and 5 show a conventional motor.

In a motor 50 shown in FIG. 4, the spring 36 and damper member 38 are not provided, The outer race 40b of the second bearing 40 contacts at the end with a step formed on the inner periphery of the motor stator part 33 and the inner race 40a of this bearing 40 is pressed and fitted at the lower end to the rotor 44 through a washer 51. The other formations are the same as in the motor 3 shown in FIG. 1.

This motor 50 is assembled as follows. First, the bearings 35 and 40 are fitted to the motor stator part 33 of the holder 32. Then, the motor shaft 31 fitted with the E-ring 41 is inserted through the above mentioned motor stator part 33. Then, the washer 51 and rotor 44 are externally fitted to the above mentioned motor shaft 31, the inner race 40a of the above mentioned bearing 40, washer 51 and rotor 44 are closely fitted and the rotor 44 is fixed to the motor shaft 31 with the fixing screw 47 under a properly applied pre-pressure. In the thus assembled motor 50, the outer races 35b and 40b of the bearings 35 and 40 are pressed and fixed to the stator part 33, the inner race 35a of the bearing 35 is pressed, fitted and fixed to the E-ring 41, the inner race 40a of the bearing 40 is pressed and fitted by the rotor 44 through the washer 51 and the motor 44 and motor shaft 31 are fixed by the fixing screw 47. Therefore, the pre-pressure at the time of assembling acts on the inner and outer races as a pre-pressure and absorbs the backlashes of the bearings 35 and 40. This pre-pressing method in which the pre-pressure at the time of assembling is maintained by the position dimension is called a fixed position pre-pressing method, is simple in the structure and is therefore adapted to making the type small and reducing the cost but has defect that the pre-pressure amount varies with the difference of the thermal expansion coefficient of the respective components by the temperature fluctuation.

In a motor 55 shown in FIG. 5, the damper member 38 and washer 37 in the disc motor 3 of this embodiment are not provided and a pre-pressure is given by the spring 36. The pre-pressing method in this motor 55 is called a fixed pressure pre-pressing method and, in this motor 55, the pre-pressure variation by the temperature fluctuation is less than in the motor 50 shown in FIG. 4.

Figure 6:
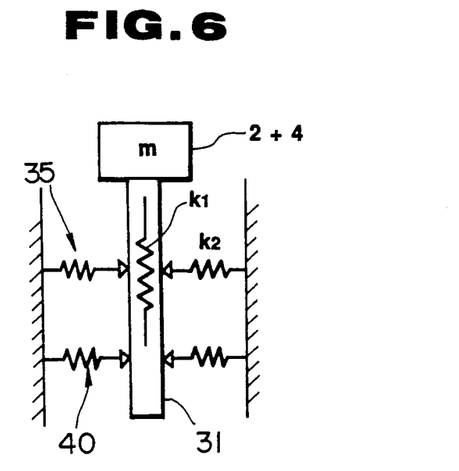
FIG. 6 is an explanatory view showing a mechanical system of a motor shaft and bearing part of a conventional spindle motor.

The mechanical system of the motor shaft and bearing part of the conventional motor 55 shown in FIG. 5 can be represented as shown in FIG. 6.

Figure 7:
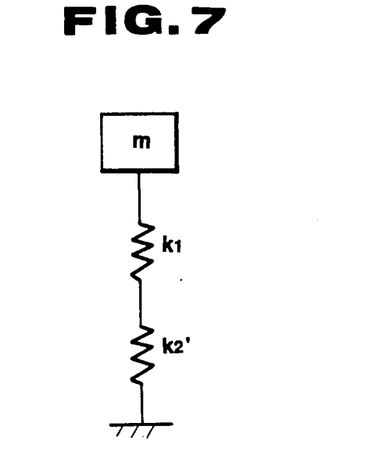
FIG. 7 is an explanatory view showing a mechanical system equvalent to that in FIG. 6.

That is to say, a photomagnetic disc 2 and turntable 4 of a mass m are fitted to the end of a motor shaft 31 of a spring constant $k_1$. The above mentioned motor shaft 31 is supported by bearings 35 and 40 and a pre-pressure sping 36 of a spring constant $k_2$. The mechanical system in FIG. 6 is considered to be equivalent to a system in which a load of a mass m is acting on the tip of a shaft of spring constants $k_1$ and $k_2$, supported by a rigid body as shown in FIG. 7

Now, in such conventional motor, however it may be designed, so long as an external turbulence exists, a resonance will exist. This shall be explained, for example, with reference to a 5¼ inch photodisc.

For example, by disc standards, it is defined that the disc mass should be within 120 grams (the mass of an actual PC substrate is scores of grams) and the disc sensor diameter should be 4 mm. If the driving set dimension is a full height (203×146×82.5 mm.), the motor shaft length will be also substantially determined.

Figure 9:
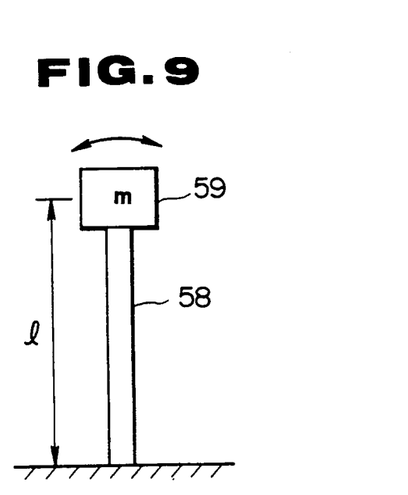
FIG. 9 is an explanatory view showing a shaft and bearing part of a simplified motor.

Here, a system in which, as shown in FIG. 9, a load 59 of a mass m is acting on the tip of a shaft 58 of a length l supported by a perfect rigid body is considered in order to simplify the system of the motor bearing part.

If the secondary moment of the cross-section of the above mentioned shaft 58 is I and the Young's modulus is E, the free oscillation number by the deflection of the shaft will be:

$$\omega_o = \sqrt{K/m} \quad (rad/s)$$

$K=3 EI/l^3$. K: Spring constant of the shaft.

In case such motor as is shown in FIG. 4 or 5 is used, in the actual system, the bearing spring constant will be different with the size of the bearing pre-pressure bu the spring constant of the shaft and the spring constant of the bearing will be compounded. In the 5¼ inch drive, the shaft diameter is defined to be 4 mm. and the resonant frequency of this shaft is near several hundred $H_z$. This is the same irrespective of the fixed position pre-pressure shown in FIG. 4 or the fixed pressure pre-pressure shown in FIG. 5.

Figure 10:
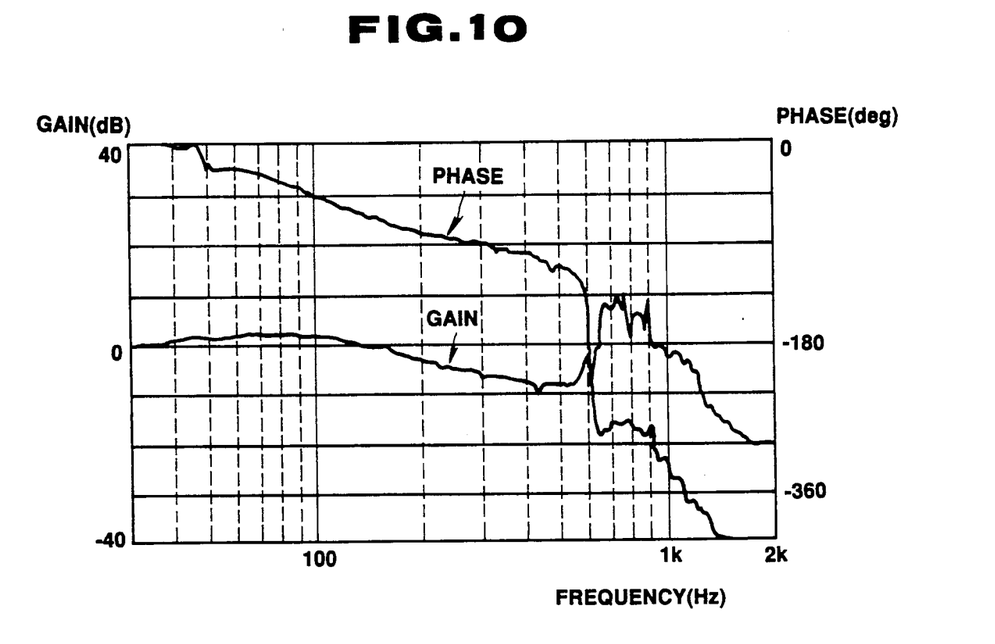
FIG. 10 is a graph showing frequency characteristics of a linear servo system in case a conventional spindle motor is used.

FIG. 10 shows examples of frequency characteristics the phase difference and gain of a linear motor servo system in case a conventional motor is used.

In case the number of revolutions of the disc is set to be 180 rpm (30 $H_z$) and the responding frequency of the linear motor is set to be a hundred and several tens of $H_z$, this frequency and the resonant frequency will approach each other too closely and the phase will rotate too much to be removed with a filter and, as shown in FIG. 10, a resonant point of a large peak (near 600 $H_z$, in FIG. 10) will be produced and the phase and gain of the linear motor servo system will become quite unstable.

If the above mentioned resonant point can be moved to a region high enough, the resonant point will be able to be removed, for example, with a twin tea filter. However, for that purpose, the shaft rigidity and bearing rigidity must be elevated and it is not adapted to the photodisc drive aiming at making the type small.

Also, the resonance can be avoided by extremely reducing the pre-pressure. However, in such case, the shaft swing of the motor will be produced. It is not reaslistic.

Therefore, in the present invention, such vibration attenuating means attenuating the vibration of the motor shaft as, for example, the damper member 38 in the first embodiment is provided so that the resonant peak may be controlled while giving a sufficient pre-pressure.

Figure 8:
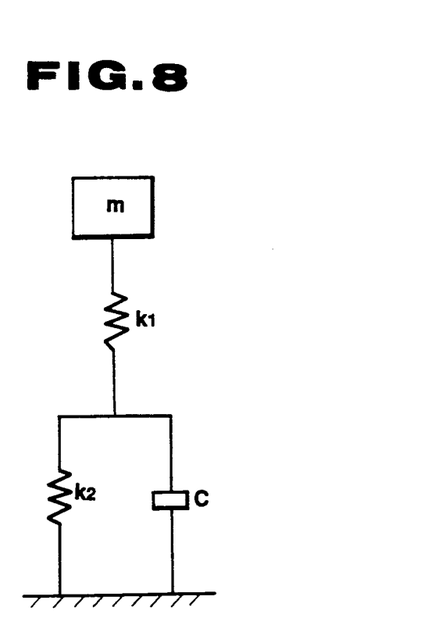
FIG. 8 is an explanatory view showing a mechanical system of a motor shaft and bearing part of a disc motor.

The mechanical system of the motor shaft and bearing part in case the bearing part is provided with the damper memnber 38 as in the first embodiment can be considered to be a system in which the spring constant $k_2$ of the bearings 35 and 40 provided in parallel and the viscosity resistance c of the damper member 38 are connected in series to the spring constant $k_1$ of the motor shaft 31 as shown in FIG. 8.

Figure 11:
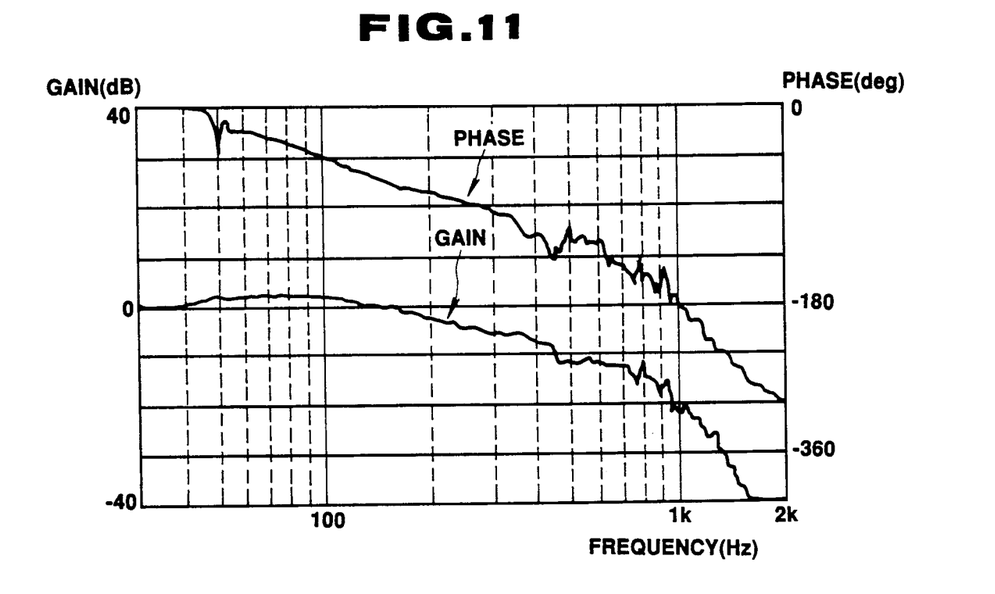
FIG. 11 is a graph showing frequency characteristics of a linear servo system in case a disc motor is used.

The frequency characteristics of the phase difference and gain of a linear servo system in case the motor 3 provided thus with a viscosity resistance device by the damper member 38 is used are shown in FIG. 11. As shown in FIG. 11, as compared with the case of using the conventional motor shown in FIG. 10, the peak of the resonant point is much lower, the phase rotation is less and the linear motor serevo system is higher in the phase margin and gain margin and is more stable.

The motor shaft 31 and bearing part are lighter than the linear motor and others and can absorb vibrations with the damper more easily than the other devices.

By the way, in the example shown in FIG. 1, the spring 36 energizes at one end the bearing 40 through the damper member 38 but may be contacted at the other end with the bearing 35 to energize it.

Figure 12:
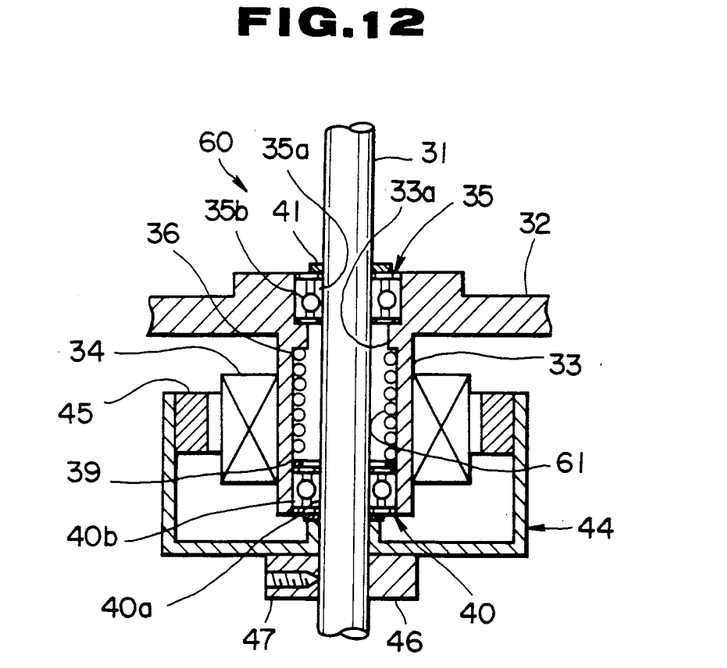
FIG. 12 is a sectioned view of a disc motor in the second embodiment of the present invention.

FIG. 12 is a sectioned view of a disc motor in the second embodiment of the present invention.

In a motor 60 of this embodiment, the damper member 38 and washer 37 in the first embodiment are not provided, as a vibration attenuating means, instead of the above mentioned damper member 38, the spring 36 giving the pre-pressure is coated with a damper member 61.

According to this embodiment, the formation is simpler than in the first embodiment.

The other formations, operations and effects are the same as in the First embodiment.

Figure 13:
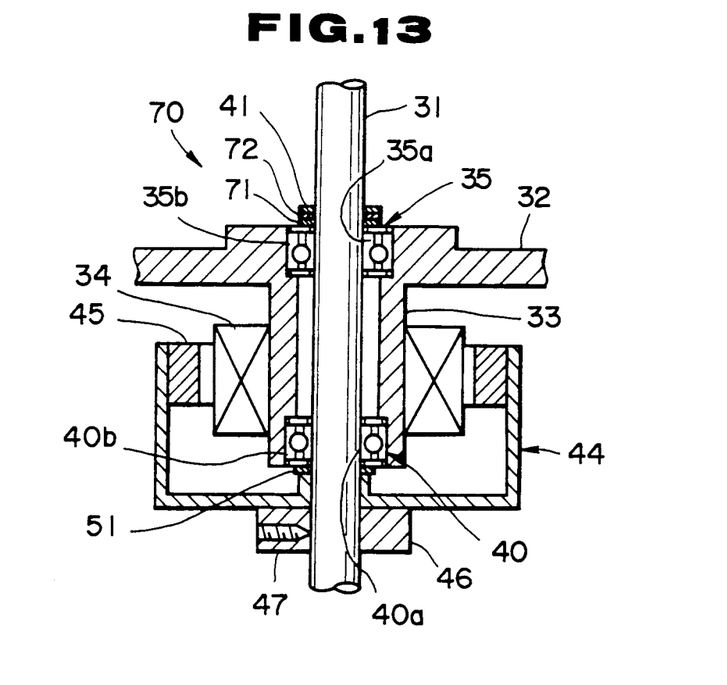
FIG. 13 is a sectioned view of a disc motor in the third embodiment of the present invention.

FIG. 13 is a sectioned view of a disc motor in the third embodiment of the present invention.

In a motor 70 of this embodiment, a fixed position pre-pressing method is used, the same as in the motor 50 shown in FIG. 4, the spring 36 and damper member 38 are not provided, the outer race 40b of the second bearing 40 contacts at the upper end with a step formed on the inner periphery of the motor stator part 33 and the inner race 40a of this bearing 40 is pressed and fitted at the lower end to the rotor 44 through a washer 51. In this embodiment, as a vibration attenuating means, instead of the above mentioned damper member 38, a ring-like damper member 72 is provided through a washer 71 above the inner race 35a of the first bearing 35 and is pressed and fitted on the upper part with the E-ring 41 fixed to the motor shaft 31.

According to this embodiment, the formation is simpler than in the first embodiment.

The other formations, operations and effects are the same as in the first embodiment.

Figure 14:
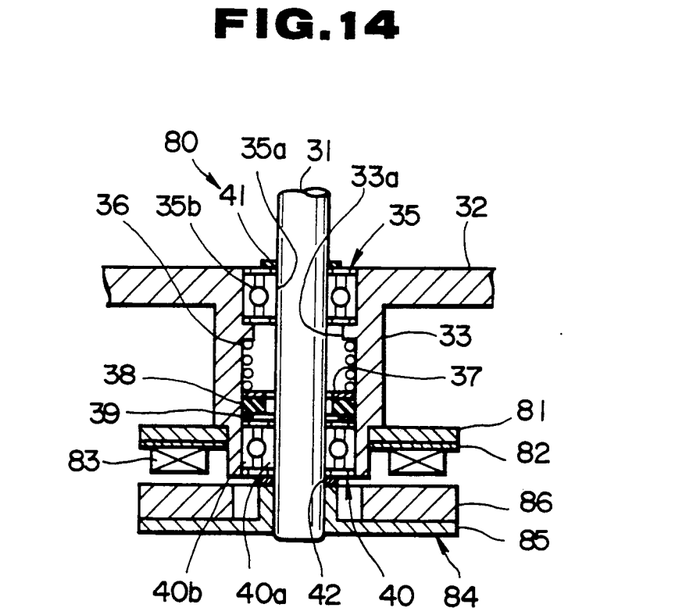
FIG. 14 is a sectioned view of a disc motor in the fourth embodiment of the present invention.

FIG. 14 is a sectioned view of a disc motor in the fourth embodiment of the present invention.

The disc motors in the above mentioned first to third embodiments are all outer rotor type motors but the motor 80 in this embodiment is of a plane opposed type.

In the motor 80 of this embodiment, a disc-like stator yoke 81 is fitted to the motor stator part 33 on the outer periphery on the lower part side and a coil 83 is fitted to the lower surface of this stator yoke 81 through a coil substrate 82.

Also, the inner race 40a of the second bearing 40 is pressed and fitted to a rotor 84 fixed to the motor shaft 31 through the washer 42. This rotor 84 has a disc-like rotor yoke 85 and a rotor magnet 86 opposed to the above mentioned coil 83 with a predetermined clearance is fitted to this rotor yoke 85 on the upper surface.

The other formations, operations and effects are the same as in he first embodiment.

Figure 15:
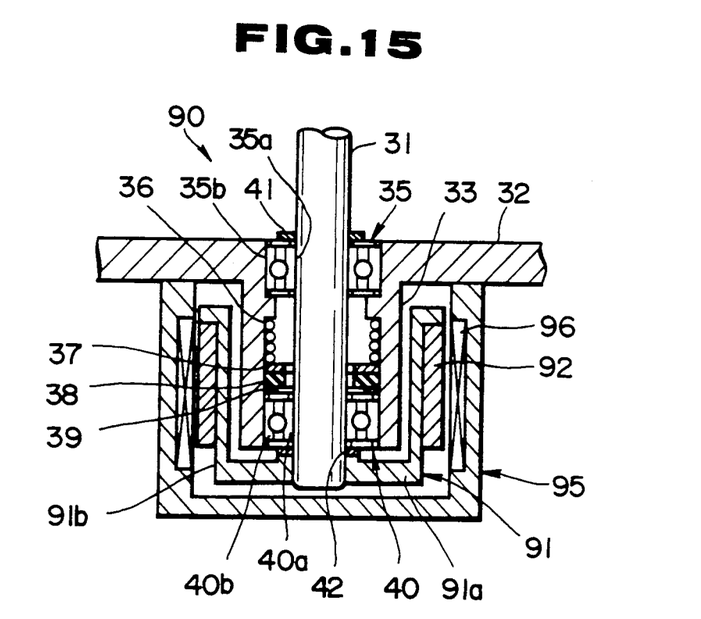
FIG. 15 is a sectioned view of a disc motor in the fifth embodiment of the present invention.

FIG. 15 is a sectioned view of a disc motor in the fifth embodiment of the present invention.

The motor 90 in this embodiment is of an inner rotor type.

In the motor 90 of this embodiment, a rotor yoke 91 is fixed to the motor shaft 31 at the lower end, is pressed and fitted to the inner race 40a of the second bearing 40 through the washer 42 and has a disc part 91a externally fitted and fixed to the above mentioned motor shaft 31 and a cylindrical part 91b extended upward from the outer periphery of the disc part 91a. A rotor magnet 92 is fitted to the above mentioned cylindrical part 91b on the outer periphery.

A cylindrical stator yoke 95 closed in the bottom is fixed to the holder 32 on the lower surface so as to enclose the above mentioned rotor yoke 91. A coil 96 opposed with a predetermined clearance to the above mentioned rotor magnet 92 is fitted to the cylindrical part of this stator yoke 95 on the inner periphery.

The other formations, operations and effects are the same as in the first embodiment.

By the way, the present invention is not limited to the above mentioned respective embodiments. For example, a motor of any other type than of the embodiments may be used for the rotating driving means. The bearing is not limited to a ball bearing but may be a sliding bearing or the like. The light pickup moving means may be of a swing arm system.

Also, the present invention can be applied not only to the recording form of photomagnetic recording by varying the magnetizing direction but also to forming pits, varying the reflection factor or transmittivity and forming bubles.

As explained above, according to the present invention, as the vibration of the rotary shaft of the rotating driving means adversely influencing the stability of the driving controlling system of the light pickup moving means is attenuated, the driving controlling system of the light pickup moving means is stabilized.

It is apparent that, in this invention, working modes different in a wide range can be formed on the basis of this invention without departing from the spirit and scope of the invention. This invention is not restricted by its specific working modes except being limited by the appended claims.

What is claimed is:

1. An optical information recording and reproducing apparatus comprising:
    light pickup means at least recording, reproducing or erasing information by radiating a light beam to an optical recording medium;
    light pickup moving means moving said light pickup means in the direction crossing said optical recording medium recording and reproducing region;
    driving signal generating means generating a signal driving said light pickup moving means from the light returning from said optical recording medium;
    rotating driving means having a rotary shaft for rotatably moving said optical recording medium, and
    vibration attenuating means attenuating the vibration of the rotary shaft of said rotating driving means, said vibration attenuating means being integrated with said rotating driving means, and acting directly on the rotary shaft.

2. An optical information recording and reproducing apparatus, comprising:
    light pickup means at least recording, reproducing or erasing information by radiating a light beam to an optical recording medium;
    light pickup moving means moving said light pickup means in the direction crossing said optical recording medium recording and reproducing region;
    driving signal generating means generating a signal driving said light pickup moving means from the light returning from said optical recording medium;
    rotating driving means having a rotary shaft for rotatably moving said optical recording medium, wherein said rotating driving means includes a means for giving a pre-pressure to bearings of said rotary shaft, and
    vibration attenuating means attenuating the vibration of the rotary shaft of said rotating driving means, wherein said attenuating means includes a viscosity resistance provided within said pre-pressure giving means.

3. An optical information recording and reproducing apparatus according to claim 2 wherein said pre-pressure giving means gives a fixed pressure to said rotary shaft.

4. An optical information recording and reproducing apparatus according to claim 2 wherein, in said pre-pressure giving means, the pre-pressure at the time of assembling is maintained by a position dimension.

5. An optical information recording and reproducing apparatus according to claim 2 wherein said pre-pressure giving means is a spring interposed between a plurality of bearings and said viscosity resisting device has a damper member provided in one bearing.

6. An optical information recording and reproducing apparatus according to claim 5 wherein said spring is coated with said damper member.

7. An optical information recording and reproducing apparatus according to claim 4 wherein said viscosity resisting device has a damper member provided between said bearing and said pre-pressure giving means.

8. An optical information recording and reproducing apparatus according to claim 1 wherein said driving signal generating means detects a tracking error signal from the light reflected from the track of said recording medium and generates a signal driving said light pickup moving means on the basis of said tracking error signal.

9. An optical information recording and reproducing apparatus accoring to claim 1 wherein said rotating driving means is an outer rotor type motor.

10. An optical information recording and reproducing apparatus according to claim 1 wherein said rotating driving means is a plane opposed type motor.

11. An optical information recording and reproducing apparatus according to claim 1 wherein said rotating driving means is an inner rotor type motor.

* * * * *